US011716623B2

(12) United States Patent
Grutzmacher et al.

(10) Patent No.: US 11,716,623 B2
(45) Date of Patent: *Aug. 1, 2023

(54) ZERO TRUST WIRELESS MONITORING - SYSTEM AND METHOD FOR BEHAVIOR BASED MONITORING OF RADIO FREQUENCY ENVIRONMENTS

(71) Applicant: 802 Secure, Inc., Pleasanton, CA (US)

(72) Inventors: Konrad Grutzmacher, Berkeley, CA (US); Clifford Fernandez, Huntington Beach, CA (US)

(73) Assignee: 802 Secure, Inc., Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/961,215

(22) Filed: Oct. 6, 2022

(65) Prior Publication Data

US 2023/0031182 A1    Feb. 2, 2023

Related U.S. Application Data

(63) Continuation of application No. 16/365,393, filed on Mar. 26, 2019, now Pat. No. 11,540,130.

(60) Provisional application No. 62/800,927, filed on Feb. 4, 2019.

(51) Int. Cl.
*H04W 24/08* (2009.01)
*H04W 12/08* (2021.01)
*H04W 12/122* (2021.01)
*H04L 9/40* (2022.01)

(52) U.S. Cl.
CPC .......... *H04W 12/08* (2013.01); *H04L 63/1425* (2013.01); *H04W 12/122* (2021.01); *H04W 24/08* (2013.01)

(58) Field of Classification Search
CPC ... H04W 24/08; H04L 63/1425; H04W 12/122; H04W 12/08
USPC ............................................................ 726/2
See application file for complete search history.

(56) References Cited

U.S. PATENT DOCUMENTS

| 8,249,028 | B2 | 8/2012 | Porras et al. |
| 8,307,405 | B2 | 11/2012 | Dow et al. |
| 8,955,078 | B2 | 2/2015 | Hoggan et al. |
| 9,106,479 | B1 | 8/2015 | Mukerji et al. |
| 9,185,095 | B1 | 11/2015 | Moritz et al. |
| 9,189,617 | B2 | 11/2015 | Sherman |
| 9,467,292 | B2 | 10/2016 | Nahari |

(Continued)

OTHER PUBLICATIONS

Extended European Search Report Dated Jun. 30, 2022; European Patent Application No. 20752334.1, 13 pp. total.

(Continued)

*Primary Examiner* — Josnel Jeudy
(74) *Attorney, Agent, or Firm* — Womble Bond Dickinson (US) LLP (57) ABSTRACT

A System and Method is provided that enable identifying cyber security attacks using observation and monitoring of end point activity. By following and monitoring the wireless connection related activities of endpoint devices as they cycle through various steps leading to establishing a connection to the secure network, a knowledge base is established in the cloud by analysis of the actions, and communication to build the confidence that the users of the network are where they should be. In one embodiment, no access is provided until a user presents valid credentials. Based on these credentials the network then builds a specific path based on access controls, tunnels or other techniques to control the user's communication and access to specific targets within the network.

20 Claims, 4 Drawing Sheets

(56) References Cited

U.S. PATENT DOCUMENTS

| | | | |
|---|---|---|---|
| 9,961,067 | B2 | 5/2018 | Hoggan et al. |
| 10,091,798 | B2 | 10/2018 | Learned et al. |
| 10,110,585 | B2 | 10/2018 | Ghafourifar et al. |
| 11,184,374 | B2* | 11/2021 | Shu et al. ............. G06F 21/554 |
| 2002/0197978 | A1 | 12/2002 | Zavidniak et al. |
| 2004/0137915 | A1 | 7/2004 | Diener et al. |
| 2006/0038677 | A1 | 2/2006 | Diener et al. |
| 2006/0128311 | A1 | 6/2006 | Tesfai |
| 2009/0199296 | A1 | 8/2009 | Xie et al. |
| 2009/0271841 | A1 | 10/2009 | Dow et al. |
| 2010/0299292 | A1* | 11/2010 | Collazo ............... G06F 21/577 |
| | | | 706/14 |
| 2012/0151565 | A1 | 6/2012 | Fiterman |
| 2014/0036841 | A1 | 2/2014 | Gray et al. |
| 2014/0247144 | A1 | 9/2014 | Proud |
| 2015/0095655 | A1 | 4/2015 | Sherman |
| 2015/0349810 | A1 | 12/2015 | Baxley et al. |
| 2017/0366527 | A1 | 12/2017 | Oxford et al. |
| 2018/0068122 | A1 | 3/2018 | Madera et al. |
| 2018/0097845 | A1 | 4/2018 | Chen et al. |
| 2018/0211179 | A1 | 7/2018 | Dzierwa |
| 2019/0277939 | A1 | 9/2019 | Li et al. |
| 2020/0028745 | A1 | 1/2020 | Parkvall et al. |
| 2020/0252800 | A1 | 8/2020 | Grutzmacher et al. |
| 2021/0144556 | A1 | 5/2021 | Chen et al. |

OTHER PUBLICATIONS

International Search Report and Written Opinion of the International Searching Authority Dated Apr. 9, 2020; International Application No. PCT/US2020/013557, 11 pp. total.

\* cited by examiner

| FC | D/I | Address 1 | Address 2 | Address 3 | SC | Address 4 | Frame body | CRC |

| A RF Scanning engine of a monitoring system continuously scans the Radio frequency air space for any communication between clients and networks within the air space being monitored. |
|---|

S601

| When a monitored client connects to and communicates with an approved network the RF scanning engine recognizes both the monitored client and the approved network and collects the data on activities leading to connection |
|---|

S602

| The collected data is sent to an analysis system in a secure cloud over a dedicated and secure link. |
|---|

S603

| The data received is stored and analyzed by the distributed processors in the cloud to establish a normal behavior pattern for the connection. The normal behavior pattern is updated and saved |
|---|

ZERO TRUST WIRELESS MONITORING - SYSTEM AND METHOD FOR BEHAVIOR BASED MONITORING OF RADIO FREQUENCY ENVIRONMENTS

CROSS REFERENCE TO RELATED APPLICATIONS

This application is a continuation of U.S. Pat. Application No. 16/365,393 filed Mar. 26, 2019, which claims the benefit of U.S. Provisional Application No. 62/800,927 filed on Feb. 4, 2019, the disclosures of which are incorporated herein by reference.

TECHNICAL FIELD

Embodiments of the disclosure relate to a system and method for identifying and preventing cyber attacks on networks, and specifically on networks via wireless access points which are vulnerable by observation of end point activity.

BACKGROUND

One of the problems of proliferation of computer systems and networks is the lack of security from cyber-attacks that have increased over the last few years. Threats against computer and data networks continue to multiply, with hackers becoming more sophisticated and innovative. Existing security solutions are unable to keep up with the challenges continuously being thrown at them.

Overview

Current security measures revolve around identifying "Rogue" or "Unauthorized" Access Points (APs) that may be connected to the Local Area Network (LAN), protocol attacks (e.g., Deauthentication, Evil Twin AP, KRACK, WPA PSK collection and recovery) or granting access based on presented authentication (e.g., Open, Pre-Shared Key, Extensible Authentication Protocol) or other Rule Based Access Control (e.g., ACCESS CONTROL LISTS, CISCO TRUSTSEC, etc.)

While these techniques may help keep the underlying network secure from attacks that are initiated, it does little to protect the end users in a busy radio frequency (RF) space. Neither does it prevent malicious access to the networks leading to attacks. Solutions such as on-device virus protection, device encryption, VPN, and other endpoint solutions must be used but these may not identify malicious client behaviors in the RF space.

In order to overcome some of the problems of exposed above, a Zero Trust Wireless Monitoring is proposed by the present disclosure.

Comparative Technologies / Concepts

While Zero Trust Wireless Monitoring is not a direct gatekeeper technology, it can be compared to existing Role Based Access Control and Network Access Control systems.

Role Based Access Control

Originally proposed by the National Institute of Standards and Technology (NIST), the Role Based Access Control (RBAC) model is now documented and maintained in INCITS 359-2012.

Security administration can be costly and prone to error because administrators usually specify access control lists for each user on the system individually. With RBAC, security is managed at a level that corresponds closely to the organization's structure. Each user is assigned one or more roles, and each role is assigned one or more privileges that are permitted to users in that role. Security administration with RBAC consists of determining the operations that must be executed by persons in particular jobs and assigning employees to the proper roles. Complexities introduced by mutually exclusive roles or role hierarchies are handled by the RBAC software, making security administration easier.

Network Segmentation/Zero Trust®

The Zero Trust® architecture concept was first proposed by Forrester Research to promote a "never trust, always verify" guiding principle. Zero Trust boundaries effectively compartmentalize different segments of the network and granting or denying access based upon:
   Secure Access via GlobalProtect and partnerships
   Inspection of All Traffic
   Advanced Threat Protection Cisco TrustSec®

Figure 1:
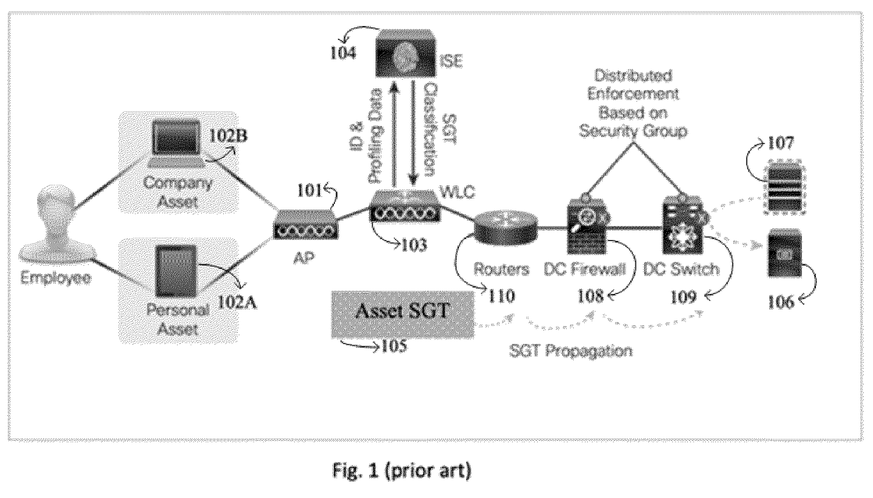
FIG. 1 is a block diagram showing a prior art network with wireless and internet access and security protocol using security group tag.

FIG. 1 shows the exemplary block diagram of Cisco TrustSec®. Cisco TrustSec® simplifies the provisioning and management of secure access to network services and applications. Unlike access control mechanisms that are based on network topology, Cisco TrustSec® policies use logical groupings, so access is consistently maintained even as resources are moved in mobile and virtualized networks. Decoupling access entitlements from IP addresses and VLANs simplifies security policy maintenance tasks, lowers operational costs, and allows common access policies to be consistently applied to wired, wireless, and VPN access.

Cisco's TrustSec® uses Identity Services Engine (ISE) to grant a logical tag called a Security Group Tag (SGT) that details the access controls, for personal assets and corporate assets accessing the network through an authenticated access point (AP) or end point. This SGT follows the end user across the CISCO infrastructure along with any access control lists created.

FIG. 1 shows the access into a network comprising switches 109, routers 110, firewalls 108 leading to resources such as HR server 106 and Finance server 107 of enterprise. The network is accessed through an authenticated access point (AP) 101 by an employee using a personal asset 102A such as an iPhone or a company asset 102B such as a Mac. The AP 101 is coupled to a wireless Local area network controller (WLC) 103 that is able to distinguish between the assets 102A and 102B. The WLC 103 is further coupled to an ISE 104 that collects profiling and classification data regarding the asset from the WLC 103 and generates an asset related SGT that includes a security classification that details the access controls for the assets 102A or 102B that is accessing the network. The SGT is then associated with the asset as an asset SGT 105 and moves through the network as the asset tries to communicate or access resources within the network such as an HR server 106 or the finance server 107. The security classification associated with the asset SGT 105 determines if the asset may access any specific resource 106 or 107 within the network. The access control is implemented by distributed access control mechanisms in the network such as domain controller (DC)

firewall 108 or DC switch 109 in front of the resource being accessed.

While these techniques may help keep the underlying network secure from attacks, it does little to protect the end users in a busy RF space. Solutions such as on-device virus protection, device encryption, VPN, and other endpoint solutions must be used but may not identify malicious client behaviors in the RF space.

Hence it will be useful to have a method and system that can provide a way to track an attacker and prevent an attack. In order to overcome some of the problems of existing systems exposed above, a Zero Trust Wireless Monitoring is proposed.

DETAILED DESCRIPTION

A System and Method are provided that enable identifying cyber security attacks using observation and monitoring of end point activity. By following and monitoring the wireless related activities of endpoint devices as they cycle through various steps leading to establishing a connection to a secure network, a knowledge base is established in the cloud by analysis of the actions, and communication to build the confidence that the users of the network are where they should be. In one embodiment, no access is provided until a user presents valid credentials. Based on these credentials the network then builds a specific path based on access controls, tunnels or other techniques to control the user's communication and access to specific targets within the network.

According to one aspect of the present disclosure, a method of monitoring a wireless client device accessing a network includes scanning, by a radio frequency scanning engine, a defined radio frequency air space for communication between the wireless client device and the network, determining, by the radio frequency scanning engine, that the wireless client device has connected to the network based on the scanned defined radio frequency air space, wherein the network is one of an approved network or an unapproved network, and collecting, by the radio frequency scanning engine, data on communication activities between the wireless client device and the network, wherein the collected data is for storage and analysis of a behavior pattern of the wireless client device.

According to another aspect of the present disclosure, a wireless monitoring device includes a radio frequency scanning engine configured to scan a defined radio frequency air space for communication between a wireless client device and a network, determine that the wireless client device has connected to the network based on the scanned defined radio frequency air space, wherein the network is one of an approved network or an unapproved network, and collect data on communication activities between the wireless client device and the network, wherein the collected data is for storage and analysis of a behavior pattern of the wireless client device.

According to another aspect of the present disclosure, a server includes a storage device and a processor coupled to the storage device. The processor is configured to receive, over a secure communication channel, first data from a monitoring device, analyze the received first data to determine a normal behavior pattern of a wireless client device's connection to an approved network, store the received first data and normal behavior pattern in the storage device, receive, over the secure communication channel, second data from the monitoring device, analyze the received second data to determine an abnormal behavior pattern of the wireless client device's connection to an unapproved network and store the received second data and abnormal behavior pattern in the storage device. The server further includes a security manager coupled to the processor in which the security manager is configured to generate a remedial action for the wireless client device based on the abnormal behavior pattern of the wireless client device and an access control policy.

With the adoption of the Internet of Things, IEEE 802.11-connected devices are much more prevalent than before and using operating systems that may not provide endpoint security solutions. These devices may operate as IEEE 802.11 Access Points or Stations at various times of their lifecycle leaving current IEEE 802.11 security platforms invisible to these states.

Following the behavior of an IEEE 802.11 device is the backbone of Zero Trust Wireless Monitoring. As a device cycles between its different phases of network connectivity, Zero Trust Wireless Monitoring observes and based on this activity generates a profile of the devices at the access point. The monitored activity comprises:

Client Unconnected to any AP
Client Connected to an Open AP
Client Connected to a WiFi Direct device
Client Connected to Approved Enterprise AP
Listening as Approved or Unapproved Access Point
Listening as Approved or Unapproved Access Point with a device connected to it.

These behaviors form the observed knowledge base that is collected, analyzed and stored in the Secure Cloud. By observing the normal action patterns of the users at the AP, the security system builds the confidence that the users of the network are where they should be and are acting according to the security protocols set up.

Observing RF Networks

Zero Trust Wireless Monitoring observes a pre-defined RF air space, collecting information and monitoring behaviors during connection between a client and a network. A typical behavior observation is the physical communication between a monitored client and a network. Two groups of networks exist in the monitored air space. 1) An approved group of networks where a client has a legitimate reason to connect to and been approved to connect to; and 2) an unapproved group of networks where the client has no reason to connect to and hence is not approved for connection.

As examples:

Observation 1: Monitored Client to Approved Network

Figure 2:
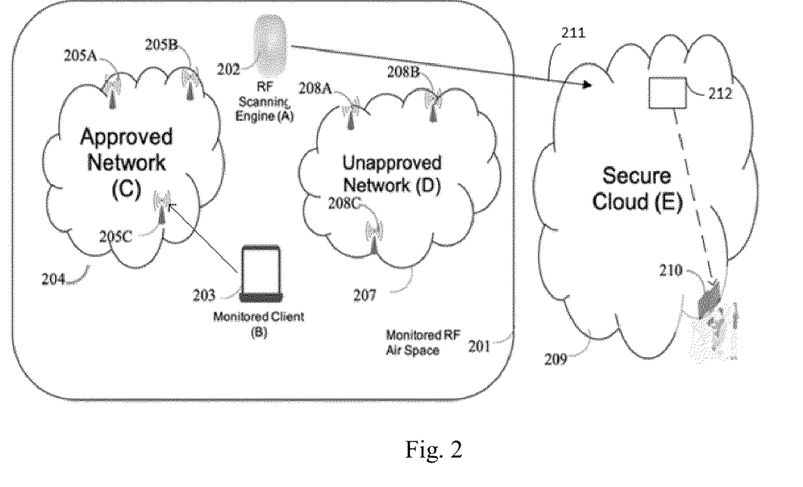
FIG. 2 is a block diagram representation of the observation of a monitored client interacting with a secure network according to one embodiment.

In one embodiment as shown in FIG. 2, a monitoring system includes a wireless monitoring device including an RF scanning engine (A) 202 with an integrated antenna, a secure-cloud based analysis system 212 and a security manager 210 in a secure cloud E 209 ("server"). The RF scanning engine (A) 202, monitors in the RF air space 201 and identifies a number of Approved (C) 204 and Unapproved (D) 207 networks with multiple radios 205A to 205C in the approved network and multiple radios 208A to 208C in the unapproved network.

A monitored client (B) 203 (e.g., a wireless client device) is observed to be communicating with the Approved Network C 204 through one of the wireless access point radios 205C by the RF scanning engine (A) 202 of monitoring system in which the RF scanning engine (A) 202 scans a defined radio frequency air space for communication between the wireless client device and the network (e.g., the approved network 204) and determines that the wireless client device has connected to the network based on the scanned defined radio frequency air space.

The RF scanning engine (A) 202 monitoring the RF airspace 201 delivers this data and information (e.g., collected data on communication activities between the wireless client device and the network) to an analysis system in the Secure Cloud (E) 209 reporting its observations via a dedicated secure communication channel 211, such that the security manager 210 in the secure cloud (E) is made aware of the transactions taking place. Even though the analysis system is shown existing in the cloud, in another embodiment, it may be implemented on the RF scanner 202 using suitable processor(s) on the RF scanning engine 202 to handle the processing load.

Observation 2: Monitored Client to Unapproved Network

Figure 3:
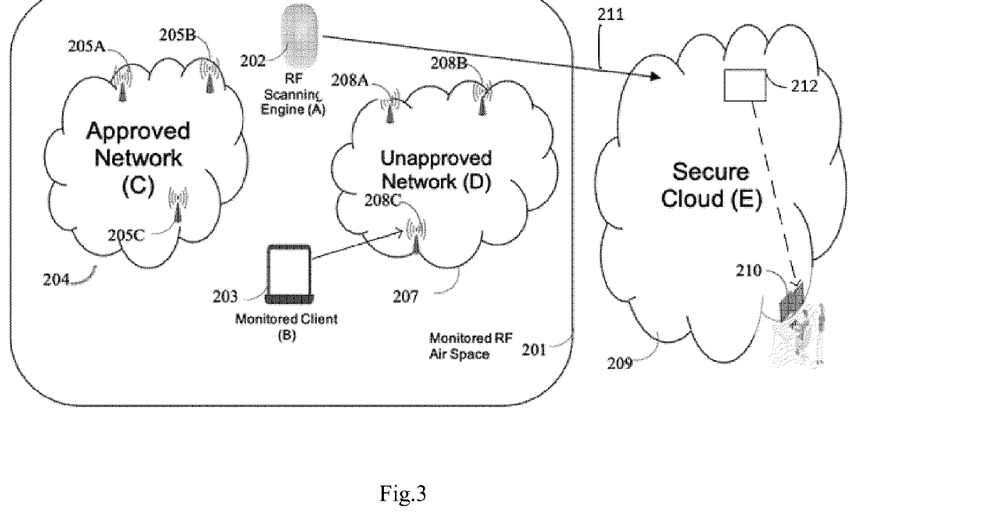
FIG. 3 is a block diagram representation of monitored client interacting with an un-secure network according to one embodiment.

In one embodiment, the same RF scanning engine (A) 202 of the monitoring system monitors the RF air space 201 and notices the monitored client (B) 203 has stopped connecting and communicating with the Approved (C) Network 204 and is now communicating with an Un-approved (D) Network 207 via one of its wireless access point radios 208C. The RF scanning engine (A) 202 delivers this observation and any available connection data (e.g., collected data on communication activities between the wireless client device and the network) to the secure cloud (E) 209 for analysis and monitoring over the dedicated and secure communication channel 211.

As this data is delivered to the Secure Cloud (E) and analyzed, information on the interaction taking place is intimated to the security manager 210. Corrective and remedial security access related actions may be taken by the security manager 210 to respond to this change in behavior of the monitored client 203 and the un-approved network (D) 207 within the monitored RF space 201.

The RF scanning engine 202 acts as a monitoring device (e.g., wireless monitoring device) for a pre-defined RF frequency space 201. The RF scanning engine monitors all radio frequency transmissions in that space and attempts to decode and classify known protocols, such as IEEE 802.11, 802.15.1, 802.15.4 and others. The details or collected data are delivered to a Secure Cloud Infrastructure (D) 209 for processing, storage, and analysis. This monitoring system enables continuous monitoring and evaluation of monitored client 203 behavior to identify normal and unacceptable ("abnormal") behavior patterns, based on which access decisions for the monitored clients 203 are made or modified.

The RF Scanning Engine

Using IEEE 802.11 as an example, the RF scanning engine ("scanner") monitors available radio channels, decoding identified frames transmitted by end point devices (e.g., wireless client devices). Within these frames the section containing the Media Access Control (MAC) header and data frame comprise a plurality of addresses that enable communication and enable the frame to reach its destination from the originator.

Figure 4:
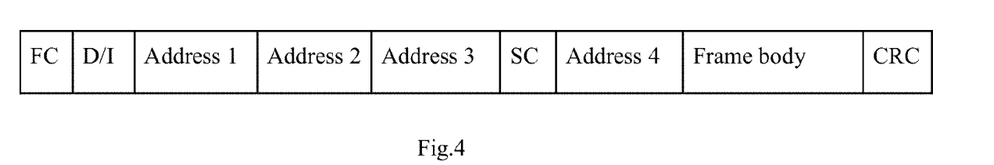
FIG. 4 is a block diagram of a section of transmitted frame showing address fields used in communication. The frames are used to identify access points and networks according to one embodiment.

FIG. 4 shows the MAC header and data frame portion that includes the addresses to the destination. The frame shown includes a Frame check/control (FC) segment, a duration and identification (D/I) segment, a sequence control segment and a segment containing the cyclic redundancy check in addition to the addresses.

Starting with this base and additional fields a mapping of communication behaviors is generated and tracked by the RF scanning engine (A) 202 of the monitoring system. IEEE 802.11 Access Points are identified through their advertised radios (BSSID) and network names (ESSID) plus additional fields as they are observed.

IEEE 802.11 Stations (clients or client devices) are identified through their radio MAC Addresses and additional fields as they are observed.

As the monitoring system learns about these different devices and networks it begins to identify the communication patterns and builds a behavior map for the client interactions within the monitored RF space 201. This behavior map is delivered to the Secure Cloud Infrastructure for any needed analysis and actions.

Secure Cloud Infrastructure

As the data is collected and passed to the Secure Cloud which acts as an administrator of the RF air space, it will define policy rules and enforcement processes applicable to the clients by placing a boundary around observed behaviors. These boundaries are made up of distinct sections and provide a level of confidence for behaviors which in turn define the level of access granted to the client.

Figure 5:
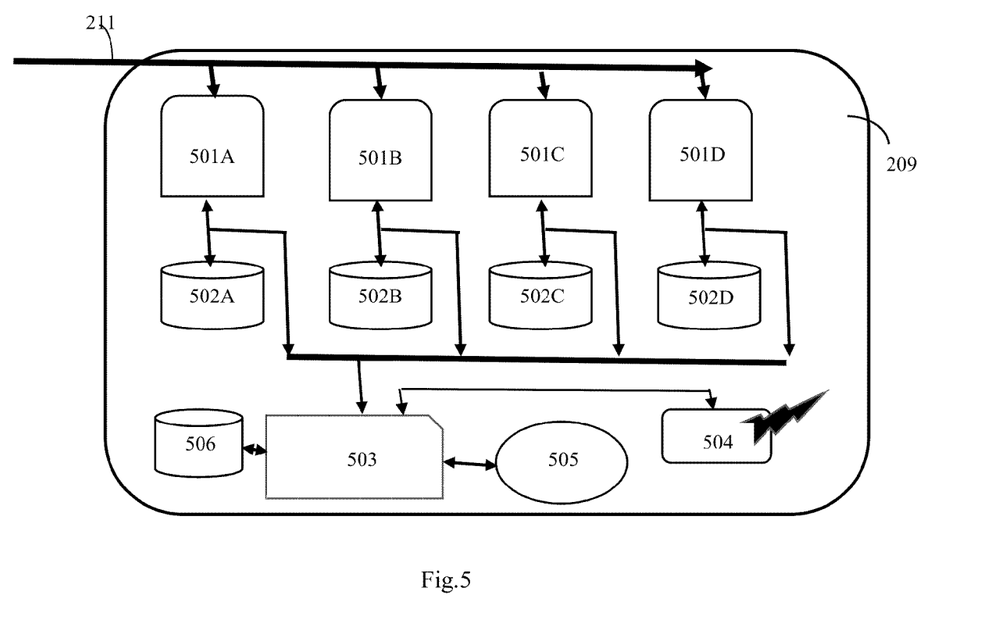
FIG. 5 is a block schematic of the distributed analysis and security management capability in the secure cloud according to one embodiment.

FIG. 5 shows an exemplary block diagram of the distributed analysis and security management capability implemented in the secure cloud 209 ("server"). In one embodiment, a similar analysis capability could be implemented on the RF scanner to analyze the data collected and initiate security controls in the monitored air space. In one embodiment, the observed data (e.g., collected data including first data and second data) from the RF scanning engine (A) 202 is fed to the secure cloud 209 via the dedicated and secure communication channel 211. The data collected is stored in distributed storage 502A to 502D associated with a plurality of distributed processors 501A to 501D within the secure cloud 209 or server.

The distributed processors 501A to 501D provide the processing power necessary to analyze the received first data and define a normal behavior pattern of a monitored client (B) 203 when wirelessly connecting to networks from the historic and current behavior of the monitored client 203 when connecting to the approved network (C) 204. When abnormal connection by the monitored client (B) 203, such as connection to an un-approved network (D) 207 is observed, the monitored client activity is observed by the RF scanning engine (A) 202 and data (e.g., second data) collected is sent to the secure cloud 209. The distributed processors 501A to 501D analyze the data and compare the analyzed data to the stored normal behavior pattern of the monitored client to identify aberrant (e.g., abnormal) behavior patterns of the monitored client (e.g., wireless client device). After the abnormal behavior pattern is determined, the behavior information extracted is sent to the security manager 504 to generate corrective and remedial security access related actions based on access control policy instructions stored in a memory 506 coupled to the security manager 504. The information is also transmitted to the security controller (e.g., computing device) of the enterprise via the communication access 504. Any interaction with the security manager is further facilitated via the input output terminal 505.

Figure 6:
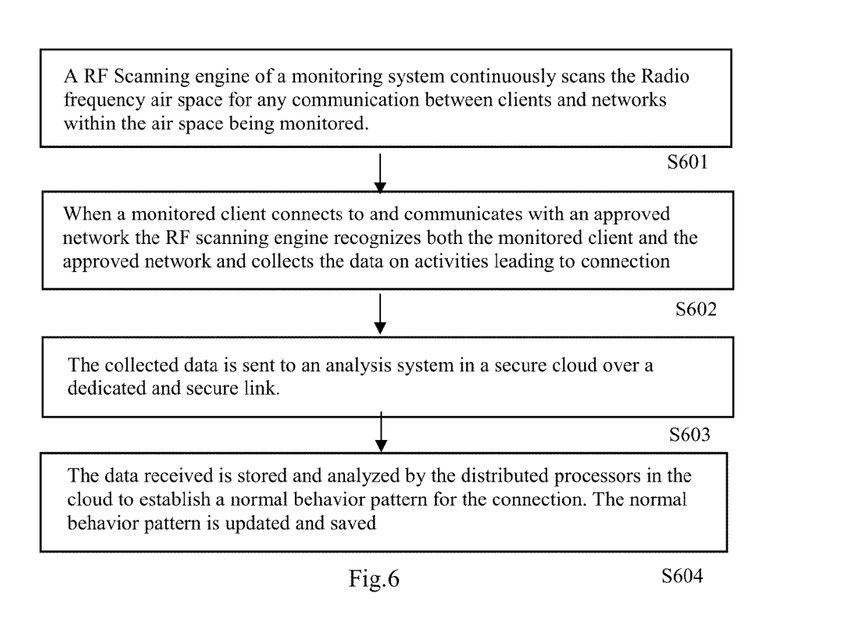
FIG. 6 is an exemplary flow chart for establishing a normal behavior pattern of a monitored client connecting to an authorized network according to one embodiment.

FIG. 6 is a flow chart of a method, in one embodiment, of how the observation of the communication activities of a monitored client connecting and communicating with an approved ("authorized") network is used to generate/update a normal behavior pattern of the communication activities.

In a monitored RF air space, monitored by the RF scanning engine, the RF scanning engine of the monitoring system continuously scans for communication activities that happen between clients and networks as they try to establish connections for communication in operation S601.

When a monitored client, that is a client in the monitored air space, tries to connect to an approved network to which the client is allowed to connect to, the client goes through a number of active steps to establish that connection. The RF scanning engine recognizes both the monitored client and the network as being an approved network for connection by the monitored client. The RF scanning engine collects the data and information on the activities (e.g., communication activities) resulting in the connection in operation S602.

The collected data and information on the activities leading to connection between the monitored client and the authorized network are considered lawful or authorized activities. The data (e.g., first data) collected on lawful or authorized activities is sent over a dedicated and secure link ("secure communication channel") to a secure cloud for analysis and establishment of a normal behavior pattern of a client device's connection with an approved network in operation S603.

The data sent to the secure cloud is stored and analyzed by the distributed processing capability within the cloud and a normal behavior pattern for connection is established for the connection of the monitored client to approved networks. Continuous scanning of the RF air space with update of the normal behavior pattern allows a historic behavioral pattern to be developed for the monitored client connecting to approved networks. This behavior pattern is stored (e.g., in one or more storage devices 502A – 502D) in the secure cloud in operation S604.

Figure 7:
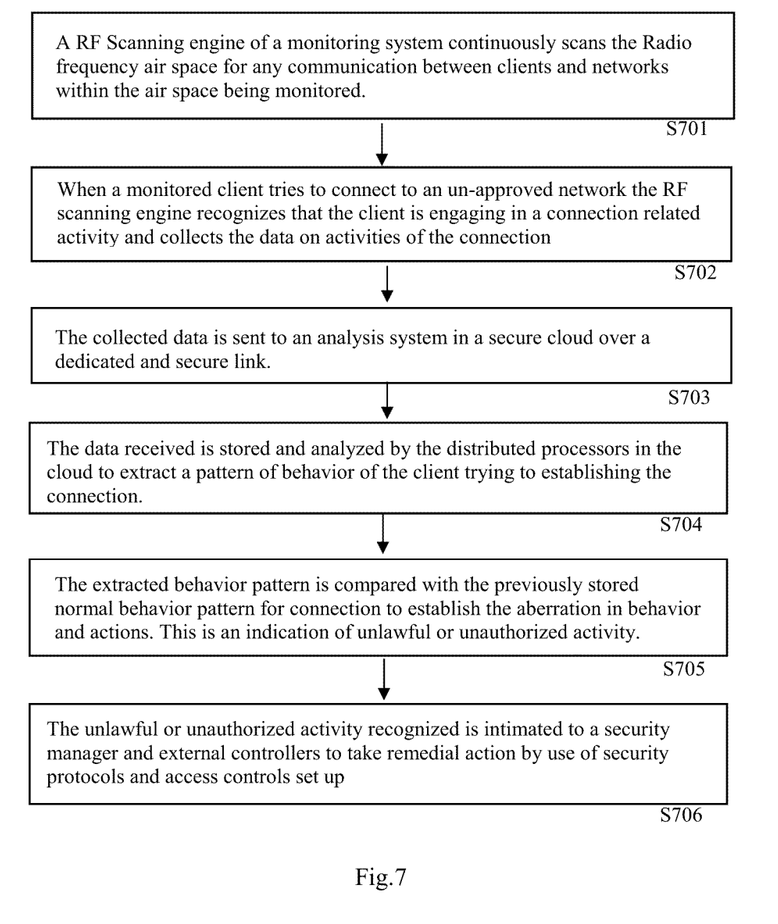
FIG. 7 is an exemplary flow chart for identifying aberrant behavior of a monitored client connecting to an unauthorized network according to one embodiment.

FIG. 7 is a flow chart of a method, in one embodiment, of how the observation of the activities of a monitored client connecting and communicating with an unapproved ("unauthorized") network within the monitored air space. Such activities can be considered aberrant or suspicious (e.g., abnormal) behavior pattern by the monitored client which can provide an indication of unlawful or unauthorized access.

In a monitored RF air space, monitored by the RF scanning engine, the RF scanning engine of the monitoring system continuously scans for client activities that happen between clients and networks as they try to establish connections for communication in operation S701.

When a monitored client, that is a client in the monitored air space, tries to connect to a network to which the client is not permitted or allowed to connect to, the client goes through a number of active steps to establish that connection. The RF scanning engine recognizes both the monitored client and the network to which the monitored client tries to connect. The RF scanning engine collects the data and information on the activities relating to the connection effort in operation S702.

The collected data and information on the activities for connection between the monitored client and the unapproved network may be considered unlawful or unauthorized activities. The data (e.g., second data) collected on unauthorized activities is sent over a dedicated and secure link ("secure communication channel") to a secure cloud for analysis and establishment of the unauthorized (e.g., abnormal) behavior of the client trying to connect to an unapproved network in operation S703.

The data sent to the secure cloud is stored and analyzed by the distributed processing capability (e.g., one or more processors 501A – 501D of FIG. 5) within the cloud and a behavior pattern for the client trying to connect to the network is established in operation S704

The extracted behavior pattern is compared with the previously stored normal behavior pattern for connection to establish the aberration (e.g., abnormal) in behavior and actions of the monitored client. This is an indication of an unauthorized activity in operation S705.

The information on the unauthorized activity is provided to a security manager in the cloud and also intimated to outside entities to take remedial action by use of security protocols and access control modifications in operation S706.

Access Point Trust Levels

During access the radios and networks advertise themselves as IEEE 802.11. Access Points themselves may be classified into different levels of trust. Each Trust Level will further define:
  Client Groups that are allowed to connect to the secure network in a specific Trust Level
  Client Group into which newly observed Clients are assigned to
  Newly observed Access Points that match similar features as existing Access points and are assigned to the group.

Client Groups

IEEE 802.11 clients are assigned into groups based upon their observed behaviors. The first time a client is observed communicating to an Access Point with an assigned Trust Level, the client is placed in the group defined by the Trust Level Policy. Further behaviors are responded to based upon the Trust Level policies the Client Group is allowed to communicate with.

Behavior Mappings and Response

The observed behavior mappings are analyzed against the defined policies. Actions are then taken based on deviations of a policy, such as:
  NOTIFY personnel through event generation FORWARD events to cloud or on-premise monitoring and response systems RESPOND by prohibiting the client from communicating to the offending network using 802.11 WiFi de-authentication frames.

Additional Implementations of the Invention

Any Radio Frequency protocol that utilizes a MAC layer or other similar technique can be monitored by this process, even if slight modifications are required:

802.15.4 and ZigBee

IEEE 802.15.4 and Zigbee are protocols for lower power wide area networks. Instead of Access Points and Clients they define:
End Nodes
Gateways
Controllers Similar behavior patterns are identified between these devices and can be monitored, reported and acted upon by the RF scanner and Secure Cloud.

Wireless Medical Telemetry Service

Wireless Medical Telemetry Service (WMTS) is a licensed FCC spectrum used by registered health care providers and equipment. Protocols may be MAC-layer based or vendor proprietary. In most cases the RF scanner and Secure Cloud can provide similar features and functions as outlined by this document.

It should be understood that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

It should also be understood that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A system for monitoring a wireless client device accessing a network, the system comprising:
a wireless monitoring device having at least one processor configured to:
scan a radio frequency air space for communication between the wireless client device and the network, wherein the network is an approved network or an unapproved network;
determine that the wireless client device has connected to the network through a wireless access point radio within the scanned radio frequency air space;
collect data and information on connection and communication activities between the wireless client device and the network;
analyze a behavior pattern of the wireless client device based on the collected data and information;
generate a knowledge base of behavior patterns based on the analysis of the behavior pattern of the wireless client device, wherein the knowledge base of behavior patterns is used to establish access control for subsequent connections between wireless client devices and networks; and
when it is determined that the network is an unapproved network, extract a behavior pattern from the collected data and information, and compare the extracted behavior pattern to behavior patterns in the knowledge base of behavior patterns to determine whether the extracted behavior pattern is an abnormal behavior pattern.

2. The system of claim 1, wherein the at least one processor is further configured to, when it is determined that the network is an approved network, recognize the network and the wireless client device.

3. The system of claim 1, wherein when it is determined that the network is an unapproved network, the at least one processor is further configured to:
- determine that the extracted behavior pattern is the abnormal behavior pattern based on the comparison, and
- perform a remedial action based on the determination that the extracted behavior pattern is the abnormal behavior pattern.

4. The system of claim 1, wherein the at least one processor is further configured to send the collected data and information to a server over a secure communication channel between the wireless monitoring device and the server.

5. The system of claim 1, wherein the at least one processor is further configured to identify a plurality of approved networks and a plurality of unapproved networks within the radio frequency air space.

6. The system of claim 5, wherein
- the system further comprises a first plurality of wireless access point radios wirelessly coupled to the wireless monitoring device, and a second plurality of wireless access point radios wirelessly coupled to the wireless monitoring device;
- the plurality of approved networks are identified through the first plurality of wireless access point radios;
- the plurality of unapproved networks are identified through the second plurality of wireless access point radios;
- the network is among the plurality of approved networks or the plurality of unapproved networks; and
- the wireless access point radio is among the first plurality of wireless access point radios or the second plurality of wireless access point radios.

7. The system of claim 1, wherein the at least one processor is further configured to build a behavioral map based on the collected data and information, and send the behavioral map to a server.

8. A wireless monitoring device for monitoring a wireless client device accessing a network, the wireless monitoring device comprising:
- at least one integrated antenna configured to scan a radio frequency air space for communication between the wireless client device and the network, wherein the network is an approved network or an unapproved network; and
- at least one processor configured to:
  - determine that the wireless client device has connected to the network through a wireless access point radio within the radio frequency air space, based on the scanning of the radio frequency air space; and
  - collect data and information on connection and communication activities between the wireless client device and the network,
- wherein a behavior pattern of the wireless client device is analyzed based on the collected data and information;
- wherein a knowledge base of behavior patterns is generated based on the analysis of the behavior pattern of the wireless client device, wherein the knowledge base of behavior patterns is used to establish access control for subsequent connections between wireless client devices and networks; and
- wherein when it is determined that the network is an unapproved network, a behavior pattern from the collected data and information is extracted, and the extracted behavior pattern is compared to behavior patterns in the knowledge base of behavior patterns to determine whether the extracted behavior pattern is an abnormal behavior pattern.

9. The wireless monitoring device of claim 8, wherein the at least one processor is further configured to send the collected data and information to a server over a secure communication channel between the wireless monitoring device and the server.

10. The wireless monitoring device of claim 8, wherein the at least one processor is further configured to identify a plurality of approved networks and a plurality of unapproved networks within the radio frequency air space.

11. The wireless monitoring device of claim 10, wherein
- the plurality of approved networks are identified through a first plurality of wireless access point radios wirelessly coupled to the wireless monitoring device;
- the plurality of unapproved networks are identified through a second plurality of wireless access point radios wirelessly coupled to the wireless monitoring device;
- the network is among the plurality of approved networks or the plurality of unapproved networks; and
- the wireless access point radio is among the first plurality of wireless access point radios or the second plurality of wireless access point radios.

12. The wireless monitoring device of claim 8, wherein
- the at least one processor is further configured to build a behavioral map based on the collected data and information, and send the behavioral map to a server.

13. A server, comprising:
- at least one storage device;
- at least one processor coupled to the at least one storage device, the at least one processor configured to:
  - receive, over a secure communication channel, collected data and information on connection and communication activities between a wireless client device and a network, wherein the network is an approved network or an unapproved network;
  - analyze the received collected data and information to determine whether the network is an unapproved network;
  - when it is determined that the network is the unapproved network, extract a behavior pattern from the received collected data and information, compare the extracted behavior pattern to behavior patterns in a knowledge base of behavior patterns to determine whether the extracted behavior pattern is an abnormal behavior pattern, and store the received collected data and information and the extracted behavior pattern in the at least one storage device when it is determined that the extracted behavior pattern is the abnormal behavior pattern; and
  - generate a remedial action for the wireless client device based on an access control policy when it is determined that the extracted behavior pattern is the abnormal behavior pattern.

14. The server of claim 13, wherein the at least one processor is further configured to send, over the secure communication channel, the generated remedial action to a computing device associated with the wireless client device.

15. The server of claim 13, wherein the at least one processor is further configured to analyze a behavior pattern of the wireless client device based on the collected data and information, generate the knowledge base of behavior patterns based on the analysis of the behavior pattern of the wireless client device, wherein the knowledge base of behavior patterns is used to establish access control for a subsequent connection between the wireless client device and the network.

16. The server of claim 13, wherein the at least one processor is further configured to when it is determined that the network is an approved network, recognize the network and the wireless client device.

17. The server of claim 13, wherein the at least one processor is further configured to when it is determined that the network is the unapproved network, determine that the extracted behavior pattern is the abnormal behavior pattern based on the comparison.

18. The server of claim 13, wherein the collected data and information are represented as a behavioral map.

19. The server of claim 13, wherein the server is a secure cloud server.

20. The server of claim 13, wherein the knowledge base of behavior patterns comprises normal behavior patterns and abnormal behavior patterns.

\* \* \* \* \*